US006195493B1

United States Patent
Bridges

(10) Patent No.: US 6,195,493 B1
(45) Date of Patent: Feb. 27, 2001

(54) UNIVERSAL CHASSIS FOR CATV HEADENDS OR TELECOMMUNICATIONS COMPANY CENTRAL OFFICE FOR OPTICAL ELECTRONIC EQUIPMENT

(75) Inventor: Rodney Lee Bridges, Lilburn, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/316,232

(22) Filed: May 21, 1999

(51) Int. Cl.[7] ........................................................ G02B 6/00
(52) U.S. Cl. ................................................................ 385/134
(58) Field of Search .................................... 385/134, 135, 385/147; 312/319.1, 333, 334.46; 370/217; 361/685, 727, 752, 788, 796

(56) References Cited

U.S. PATENT DOCUMENTS

| | | | |
|---|---|---|---|
| 4,699,270 | * 10/1987 | Bohm | 312/107 |
| 5,173,845 | * 12/1992 | Shaw | 361/798 |
| 5,398,161 | * 3/1995 | Roy | 361/727 |
| 5,790,518 | * 8/1998 | Nguyen et al. | 370/217 |
| 6,007,169 | * 12/1999 | Li et al. | 312/223 |
| 6,053,808 | * 4/2000 | Koradia et al. | 454/184 |

* cited by examiner

Primary Examiner—Akm E. Ullah

(74) *Attorney, Agent, or Firm*—Kelly A. Gardner; Kenneth M. Massaroni; Hubert J. Barnhardt

(57) ABSTRACT

A reconfigurable chassis provides thermal management of external electrical modules that are inserted into the chassis and removed from the chassis. The chassis includes a housing into which modules are inserted, and the housing has a front portion and a back portion and further has multiple guides for holding the modules. A removable fan tray is located on top of the housing. The removable fan tray holds fans in first and second positions, wherein, when the fans are located in the first position, air is directed from the front portion of the chassis, and wherein, when the fans are located in the second position, air is directed from the back portion of the chassis. The chassis also includes a removable rear connector panel for use when electrical cables coupled to the modules are to be accessed from the back portion of the housing. The removable rear connector panel is mounted to the back portion of the housing for electrically coupling to the electrical cables that are coupled to the modules. A removable panel bracket is used when the electrical cables coupled to the modules are to be accessed from the front portion of the housing. The removable panel bracket is mounted beneath the housing for routing the electrical cables from the back portion of the housing to the front portion of the housing. When the electrical cables coupled to the modules are to be accessed front the front portion of the housing, a removable front connector panel is also used, and the removable front connector panel is mounted to the front portion of the housing for electrically coupling to the electrical cables that have been routed through the removable panel bracket.

11 Claims, 18 Drawing Sheets

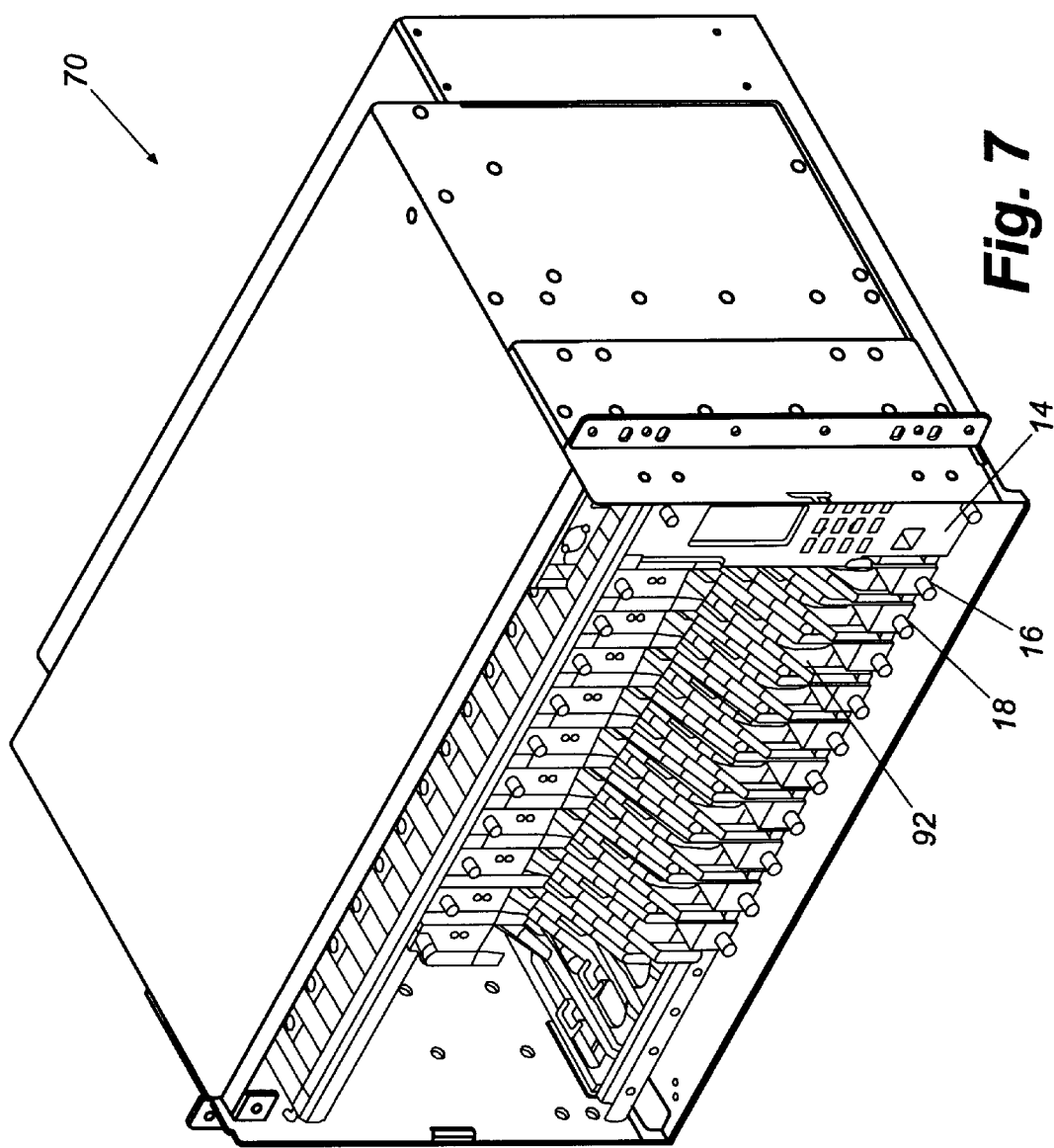

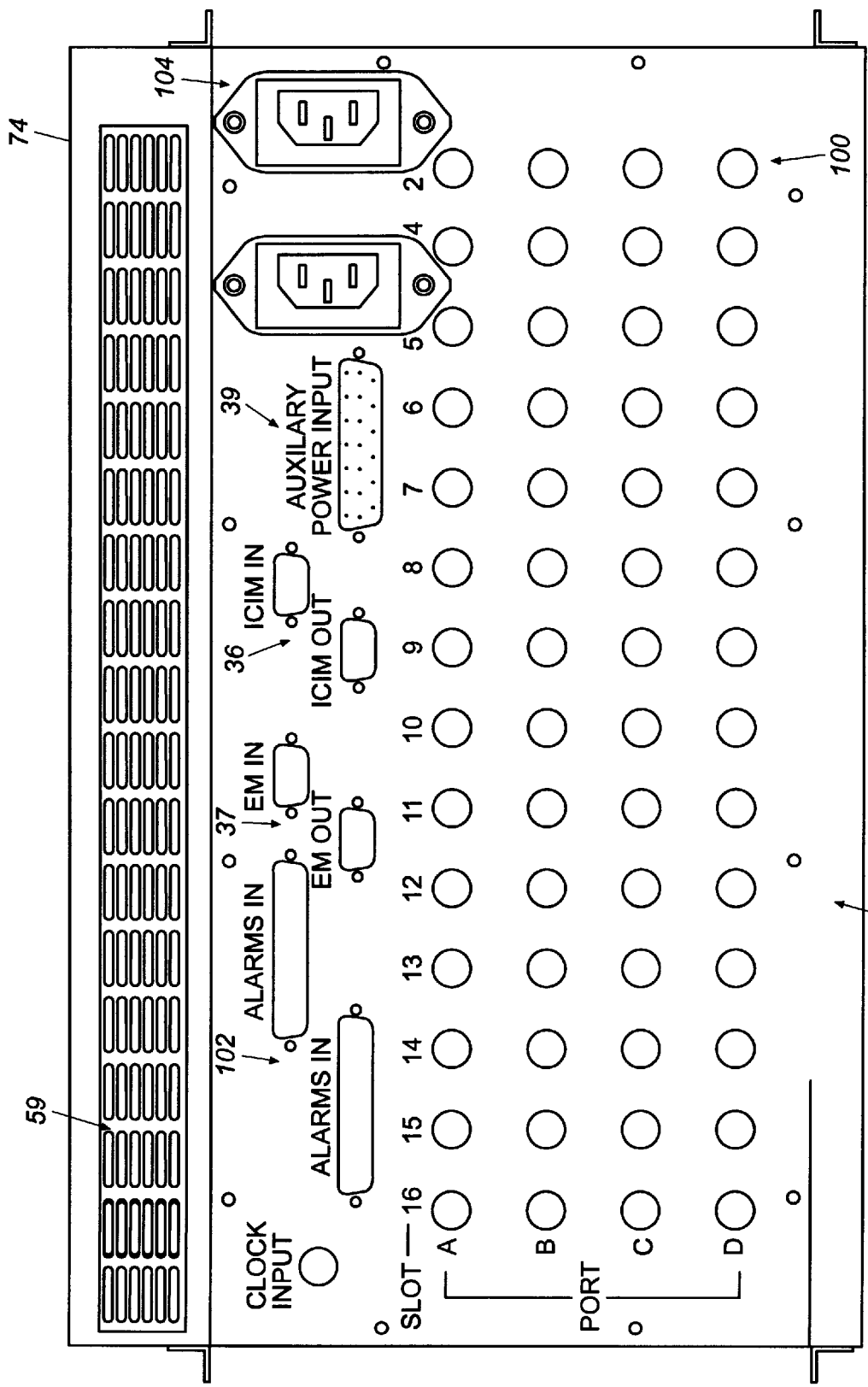

UNIVERSAL CHASSIS FOR CATV HEADENDS OR TELECOMMUNICATIONS COMPANY CENTRAL OFFICE FOR OPTICAL ELECTRONIC EQUIPMENT

FIELD OF THE INVENTION

This invention relates to fiber optic connector modules, and, more particularly, to a dual configurable optical electronic equipment chassis having thermal design systems and methods for providing cooling air to the chassis.

BACKGROUND OF THE INVENTION

The cable television and telecommunications industries frequently utilize fiber optics as a transmission medium. Cable television (CATV) headends and central offices of a telecommunication company (Telcos) include numerous pieces of multi-function, fiber-dependent equipment. Fiber optic cables require special handling. Due to their brittle nature, excessive bending or twisting can damage the fibers, severely impair their functioning or break them altogether. Allowing fiber optic cables to become tangled or handling them like metal wire cables can also leave them susceptible to breakage or signal loss. Appropriate handling of the fiber optic cables within the cable headend or Telco improves service to customers and reduces expensive repairs or replacements.

By convention, cable companies and Telcos organize equipment modules by providing racks for holding the modules. The modules frequently fit within a box or chassis mounted onto the racks. Chassis often house optical electrical equipment such as transmitters, receivers, intelligent control interface modules (ICIM) and power supplies. A chassis configuration affords cable and Telco personnel easy access to the fiber optic cables (fiber) connected to various modules. Normally, modules slide into slots in the chassis. Fiber may route to and through the chassis. For example, a transmitter module design provides for inserting the module into a chassis having fiber optic connections along a front side of the chassis. Slots in the chassis hold additional equipment or devices, for example, a personal computer (PC) connection, fan trays, connectors for external devices and alarm indicators.

Equipment configured in modules and mounted in racks generate heat. A headend or central office might contain tens of racks of chassis utilized in providing services to customers. An individual rack can contain numerous chassis stacked one on top of another within the rack and, in the Telco market, the stacks may be arranged so chassis are back to back as well. Each chassis within the rack generates heat requiring dissipation. Telcos and cable providers rely on normal convection for cooling chassis in a rack. Optionally, a fan at the top of each chassis seeks to furnish supplemental cooling. But the stacked chassis result in a "chimney effect." The hot air exhaust is pulled by fans in higher chassis up the rack. This effect causes higher chassis to heat, rather than effecting the cooling the fans originally were intended to provide. Therefore, a more effective and efficient thermal management system for the chassis would contribute to the successful operation of the fibers and other equipment contained within the chassis.

Each chassis market has specific configuration requirements. The cable market chassis, referred to as the Multiple System Operator (MSO) chassis, requires fiber cable to route from the back of the chassis. The Telco market requirements differ between the U.S. and European markets (European Telecommunications Standard Industry, ETSI). Both the U.S. Telco and ETSI markets require the fiber cable to route from the front of the chassis. Furthermore, due to stacking configurations, the U.S. Telco chassis must comply with the size requirement that it be no more than twelve inches deep, while the ETSI chassis must not exceed 280 mm. In contrast, the MSO chassis mounts vertically in a rack, meaning it cannot extend more than thirty inches deep. Chassis utilized in an MSO environment allow connections from the rear of the chassis.

Presently, to serve these differing chassis markets requires a different chassis for each market. This increases the costs of manufacturing, installation and maintenance. Therefore, a need exists for a chassis adaptable to the cable and Telco markets and provides thermal management in each configuration. The differences in approach among the Telco/CATV markets substantially complicate creation of a chassis that fulfills these objectives.

This invention provides for a reconfigurable chassis for holding electrical equipment. The chassis can be reconfigured to conform to telephone company industry standards or to cable television industry standards. The reconfigurable chassis provides for thermal management of external electrical modules that are inserted into the chassis and removed from the chassis, and the chassis includes a housing into which modules are inserted. The housing includes a front portion and a back portion and also has multiple guides for holding the modules.

The chassis further includes a removable fan tray located on top of the housing. The fan tray holds fans for cooling the modules held within the housing. The fans can be situated in a first position or in a second position. When the fans are located in the first position, air is directed from the front portion of the chassis. When the fans are located in the second position, air is directed from the back portion of the chassis.

A removable rear connector panel is also provided for use with the chassis. The rear connector panel is used when electrical cables coupled to the modules are to be accessed from the back portion of the housing. In this case, the removable rear connector panel is mounted to the back portion of the housing for electrically coupling to the electrical cables that are coupled to the modules.

A removable panel bracket is used with the chassis when the electrical cables coupled to the modules are to be accessed from the front portion of the housing, in which case the removable panel bracket is mounted beneath the housing for routing the electrical cables from the back portion of the housing to the front portion of the housing.

Along with the removable panel bracket, a removable front connector panel is used when the electrical cables coupled to the modules are to be accessed from the front portion of the housing. The removable front connector panel is mounted to the front portion of the housing for electrically coupling to the electrical cables that have been routed through the removable panel bracket.

BRIEF DESCRIPTION OF THE DRAWINGS

FIG. 7 shows a perspective, front view of the MSO chassis without a fan tray and power supplies.

FIG. 8 shows a rear view of the rear connector panel of the MSO chassis.

DETAILED DESCRIPTION

FIGS. 1–19 show a dual configurable optical electronic equipment chassis (the "basic chassis") and alternative embodiments of the basis chassis. The basic chassis can be efficiently modified to support chassis requirements for the cable television market (MSO) and chassis requirements for the U.S. and European telecommunications markets (Telco). Each market requires a distinct chassis configuration. The MSO market requires a chassis where the fiber optic cable (fiber) routes from the rear of the chassis and all other input/output (I/O) connections and air exhaust routes through the rear of the chassis. MSO chassis cannot extend more than thirty inches deep. By contrast, the Telco market requires the chassis to extend no more than twelve inches deep and routes the fiber, all I/O connections, and air exhaust from the front or rear of the chassis depending on the configuration used to mount the chassis. European Telcos expect the chassis to be no more than 280 mm deep with fiber routing, I/O connections and air exhaust through front of chassis, when chassis stack in a frame in a back-to-back configuration. The chassis of this invention with appropriate sub-assemblies configures to support the requirements of the cable industry, U.S. and European Telco markets.

Basic Chassis

Figure 1:
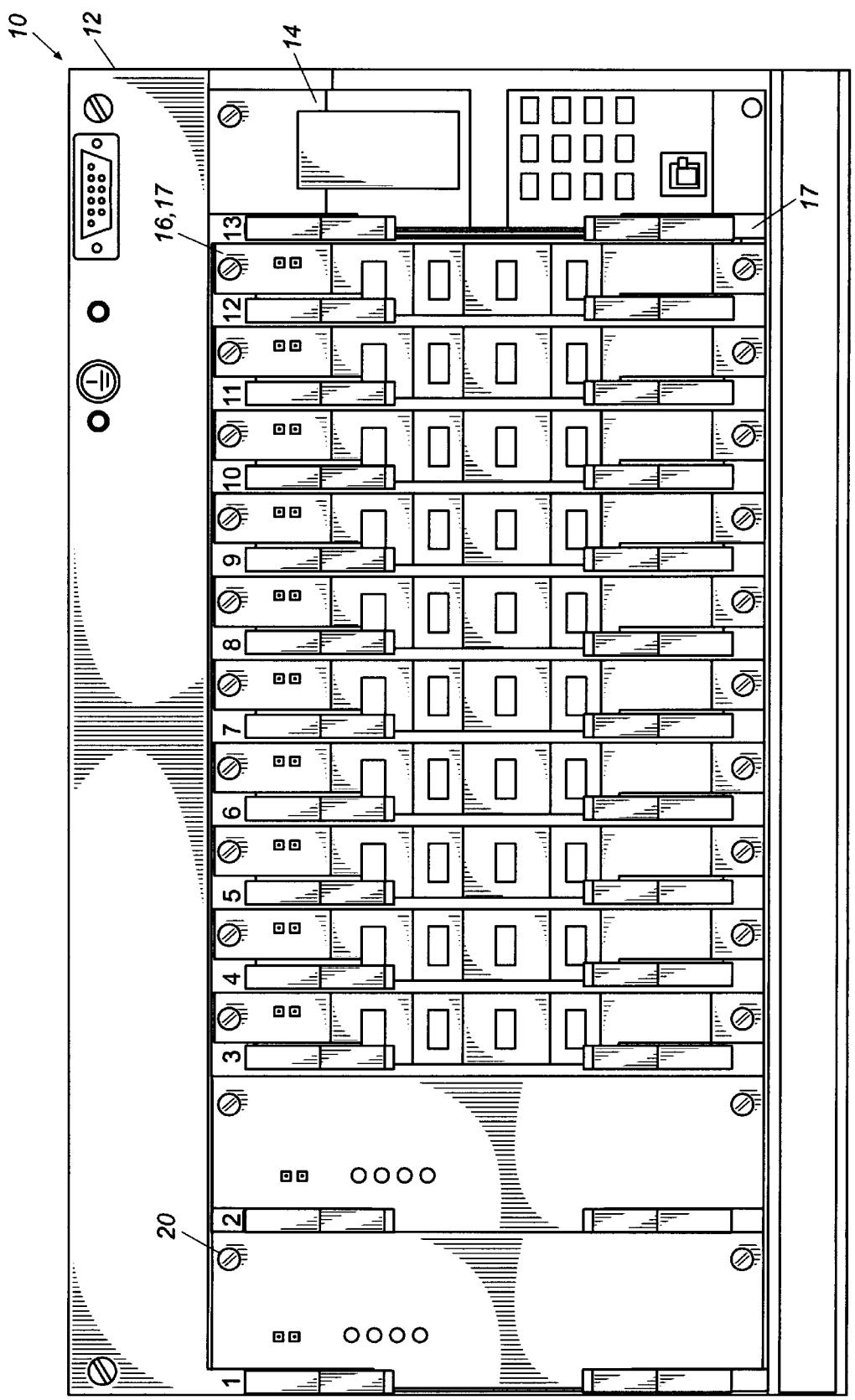
FIG. 1 shows a front view of a basic chassis of this invention.

FIG. 1 shows a front view of the basic chassis 10 of this invention. A front side 12 of the basic chassis 10 shows an illustration of modules supported by the basic chassis 10. For example, modules compatible with the basic chassis 10 include Intelligent Control Interface Modules (ICIM) 14, optical-electroptical equipment such as transmitters 16 and receivers modules 18, and modular power supplies 20. The basic chassis accommodates fourteen transmitters/receiver single slot modules 16, 18 when two power supplies 20 are utilized with the chassis. A single slot or blank module configuration may be substituted for a power supply. There are twelve slots for transmitter/receiver modules 16, 18 slots when an ICIM 14 is installed; there are ten slots when an ICIM 14 and any redundant modules are installed. Additionally, the chassis supports other modules, including radio frequency (RF) driver amplifiers, receivers, transmitters, externally modulated transmitters (EMTs), erbium-doped fiber or other amplifiers (EDFAs) optical switches, RF switches and digital reverse modules. An ejector system 17 provides for controlled insertion and extraction of the modules 14, 16, 18 and 20. The front side 12 of the basic chassis 10 supports a connection for a personal computer (PC) 22 and indicators such as a fan alarm indicator 24.

Figure 2:
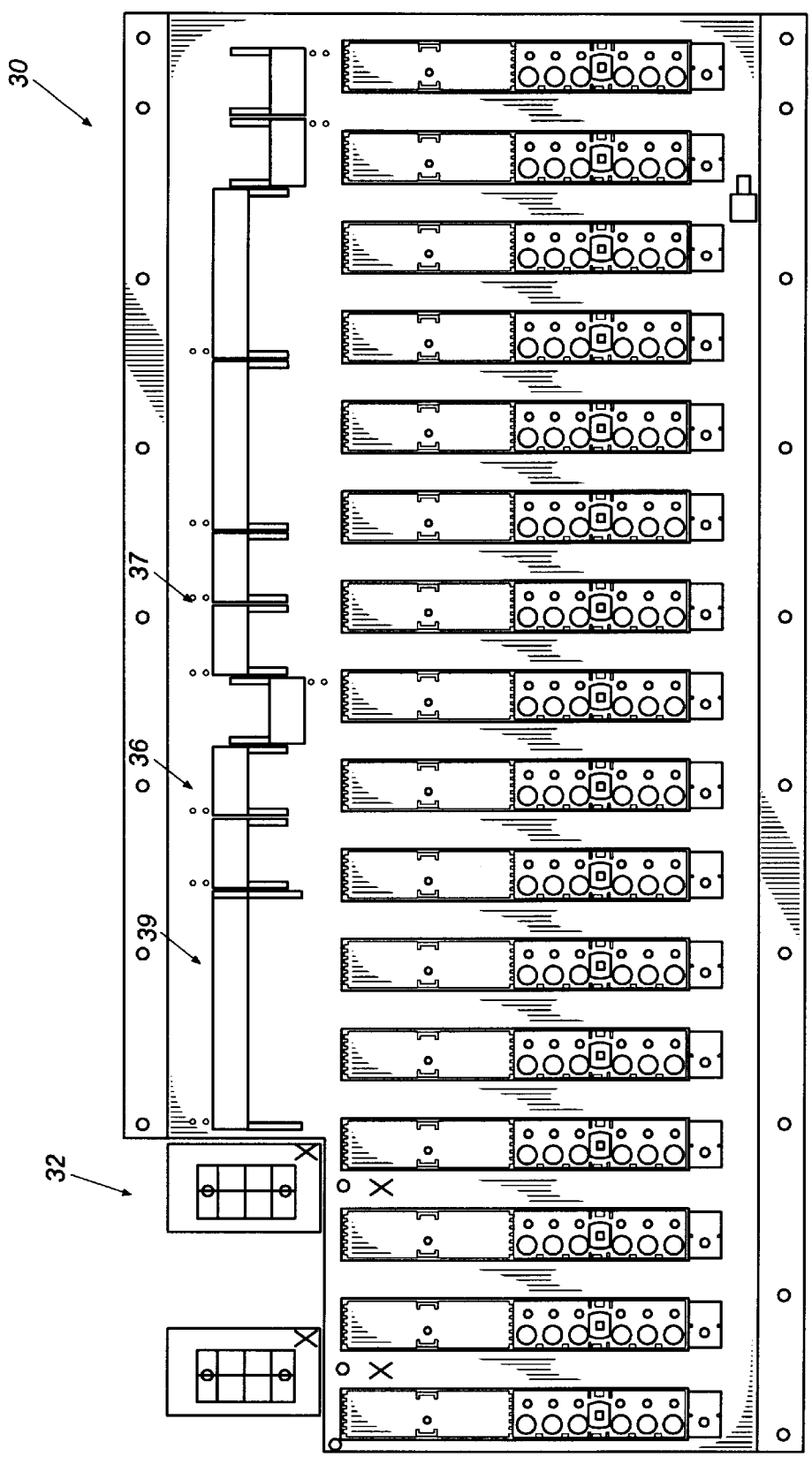
FIG. 2 shows a schematic, a rear view of the basic chassis of FIG. 1.

FIG. 2 shows a rear, schematic view of the basic chassis 10. The basic chassis includes a backplane 30. The chassis backplane 30 distributes the power supply voltages 32, a common serial bus, the high speed data bus to the ICIM 36, and four discreet external (coax) connections 38 to each of the module connectors (with the expansion capability of six). The common serial bus includes a series of wire traces within the backplane 30 that connects to all of the connectors and hence common to all module slots. The backplane 30 provides a passive circuit card assembly. A mechanical ID device attaches to the back plane 30. The mechanical ID device provides a number identification such as a mechanical/electrical ten position switch to the backplane 30 set (with a unique number) to each chassis during installation. That unique number allows the ICIM to control multiple chassis (e.g. one ICIM may control six or more chassis).

The connectors 38 utilized for interconnection to the modules include Hard Metric 2 mm pitch, IEC 917 and IEC 1076-4-101 or equivalent series and accommodate power, digital signals and coaxial signals. The connectors 38 are inherently self-guiding and allow blind mate connection. These connectors 38 reduce insertion and withdraw forces when inserting or removing modules as compared to existing devices. As configured, the connectors 38 provide four coax interconnections to the module and optionally six coax interconnections, and 110 signal/power pins. The connectors on the top of the back plane encompass cable assemblies that plug into the backplane connectors. These cable assemblies route to either the Telco chassis front side or a back side of the MSO chassis.

Figure 3:
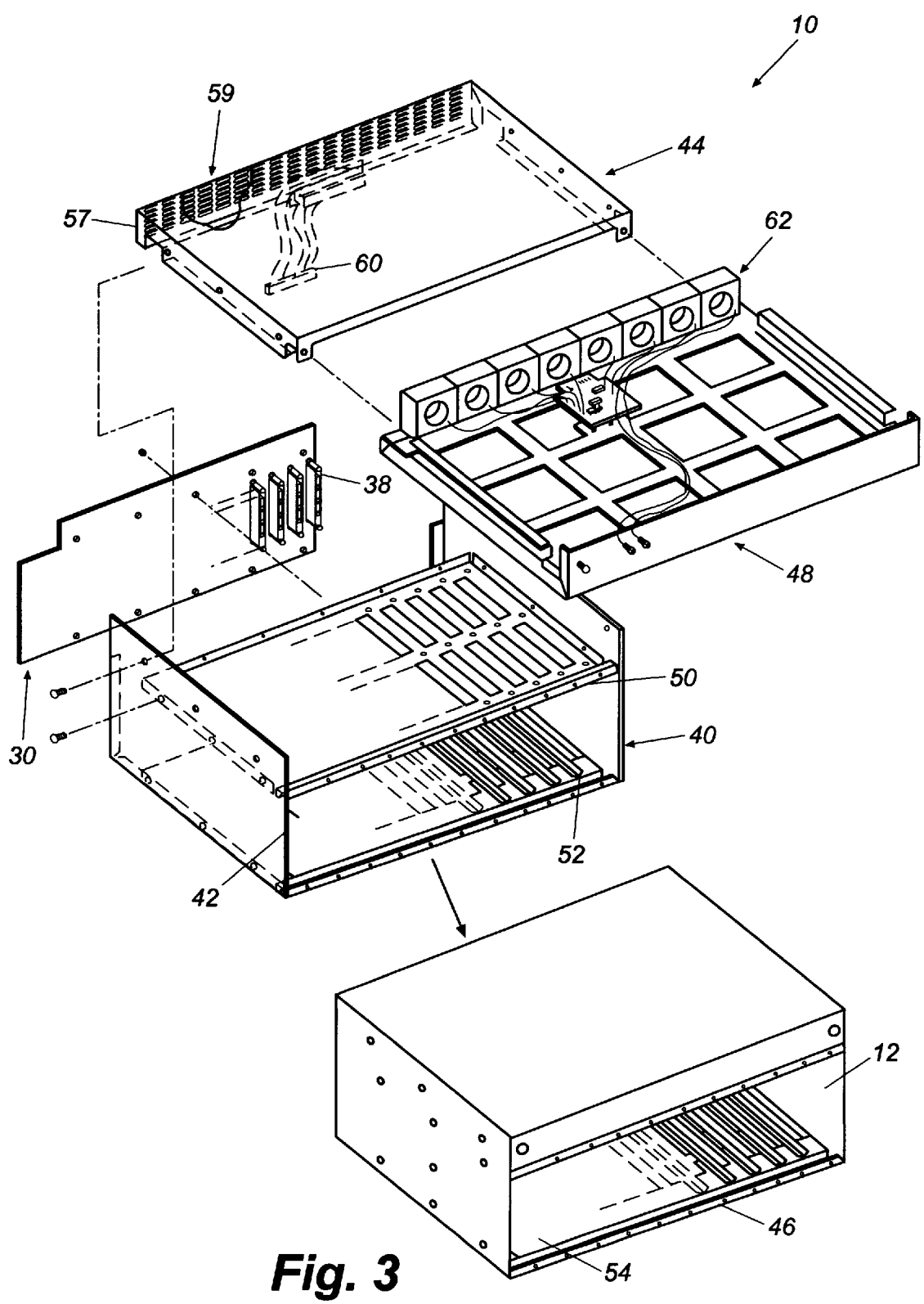
FIG. 3 shows an exploded, perspective view of the basic chassis without modules.

FIG. 3 shows an exploded, perspective view of the basic chassis 10 without modules. The basis chassis 10 includes the front side 12, the backplane 30, two sides 40, 42, a top 44 and bottom 46, a fan tray 48, and a shelf 50. The bottom 46 and two sides 40, 42, attach forming support for the basic chassis 10. The backplane 30 includes the connections shown in FIG. 2; however, for illustrative purposes, FIG. 3 shows only a few connectors 38. The bottom 46 of the basic chassis 10 includes a plurality of grids 52 on an upper portion 54 of the bottom 46 for guiding the modules into the basic chassis 10. The shelf 50 includes a plurality of grids 52 that cooperate with the bottom 46 for receiving modules. The shelf 50 attaches to the two sides 40, 42 and the backplane 30 attaches to the shelf 50.

The basic chassis 10 provide for ease of mounting in either a cable television environment or central office of a telecommunications company. Modules slide into the basic chassis 10 from the front side 12 of the basic chassis 10 and are guided by plastic module guides 52. Blind mate connection is made with the motherboard. Modules can have optional guide or ground pins installed for increased alignment. The modules will be secured and removed via ejector levers 17 (See FIG. 1). Modules will be hot installable and may be grounded directly to the basic chassis 10 by captive screws on the front of the modules. The modules/chassis injector design and self-aligning connector platform allow for minimal insertion and withdrawal forces. Fiber enters the module from the front side 12 of the basic chassis 10. Some modules accommodate up to four or more SC/APC type optical connectors or potentially other type connectors on the front side 12. SC/APC type optical connectors meet industry standards for optical connectors utilized for fiber cable connections to modules.

Fan tray 48 positions on top of the shelf 50. Top 44 slides into position above the fan tray 48 and attaches to fan tray 48 and the two sides 40, 42 and backplane 30. Top 44 includes a rear portion 57 having a plurality of vents 59. The fan tray 48 holds a printed wiring board including a fan interface and monitoring circuit board assembly 58. Assembly 58 includes filtering, fan connections, an alarm LED connection, and an interconnect with backplane cable assembly 60. A bank of fans 62, such as tube fans, on the fan tray 48 may cooperate with the vents 59 in the top 44 provide for directing air out of the basic chassis 10. The removable fan tray 48 houses the fans 62 for ease of maintenance. Fans 62 may be held in one of multiple locations or fan tray 48 by vents 59. In one embodiment, at least one fan 62 is adjustable to exhaust air from the chassis 10 via a selected path.

Note, however, that fans 62 could be affixed to the tray by clips, adhesive, straps or other mechanical fixtures. Likewise, fan tray 48 could take any form that would readily hold fans 62 in an adjustable matter. Thus, instead of multiple fan-shaped vents 59, fan try 48 could simply have a number of parallel slots to which fans 62 could be removably or slidably attached.

The basic chassis 10 can be constructed from aluminum and steel. The parts can be assembled utilizing for example, screws or rivets. The fan tray 48 may be masked and painted. The rest of the parts may have clear coat conversion coating, for example, silver or brushed aluminum color.

This invention provides for thermal management of the chassis 10. The fan 62 bank of this invention provides significantly more cooling air with a uniform distribution of air between the modules. A negative crusher fan system pulls input cooling air from the cable headend or central office environment rather than from inside the rack area. The dye cast or sheet metal modules have a heat sink surface along the side, providing more cooling surface area, rather than on the module rear. The sheet metal chassis 10 exhausts air through vent holes 59. Air draws in from the bottom side 46. This design ensures the positive cooling effects of increased air flow and less restriction of air flow through the chassis.

As discussed below, the basic chassis 10 rear exhaust fan system supports the MSO environment while the basis chassis 10 easily modifies to a front exhaust fan tray for use in Telco chassis. Preferably, this invention provides for an indefinite fan operation. For example, operation continues if one fan 62 fails. Further, this invention provides for a ten minute guaranteed operation when replacing the fan tray 48.

This invention aims to achieve basic chassis 10 heat dissipation of about 240 watts. In a six chassis rack configuration this heat dissipation meets or falls within the Network Equipment Building Standards (NEBS) BellCore GR-63-Core guidelines for 24-inch deep racks of 1,450 watts per rack.

Optionally, a door fits over the front side 12 of the basic chassis 10. The door includes vent holes positioned adjacent to the fans 62 for air exhaust and provides additional protection from electromagnetic fields.

MSO Chassis

Figure 4:
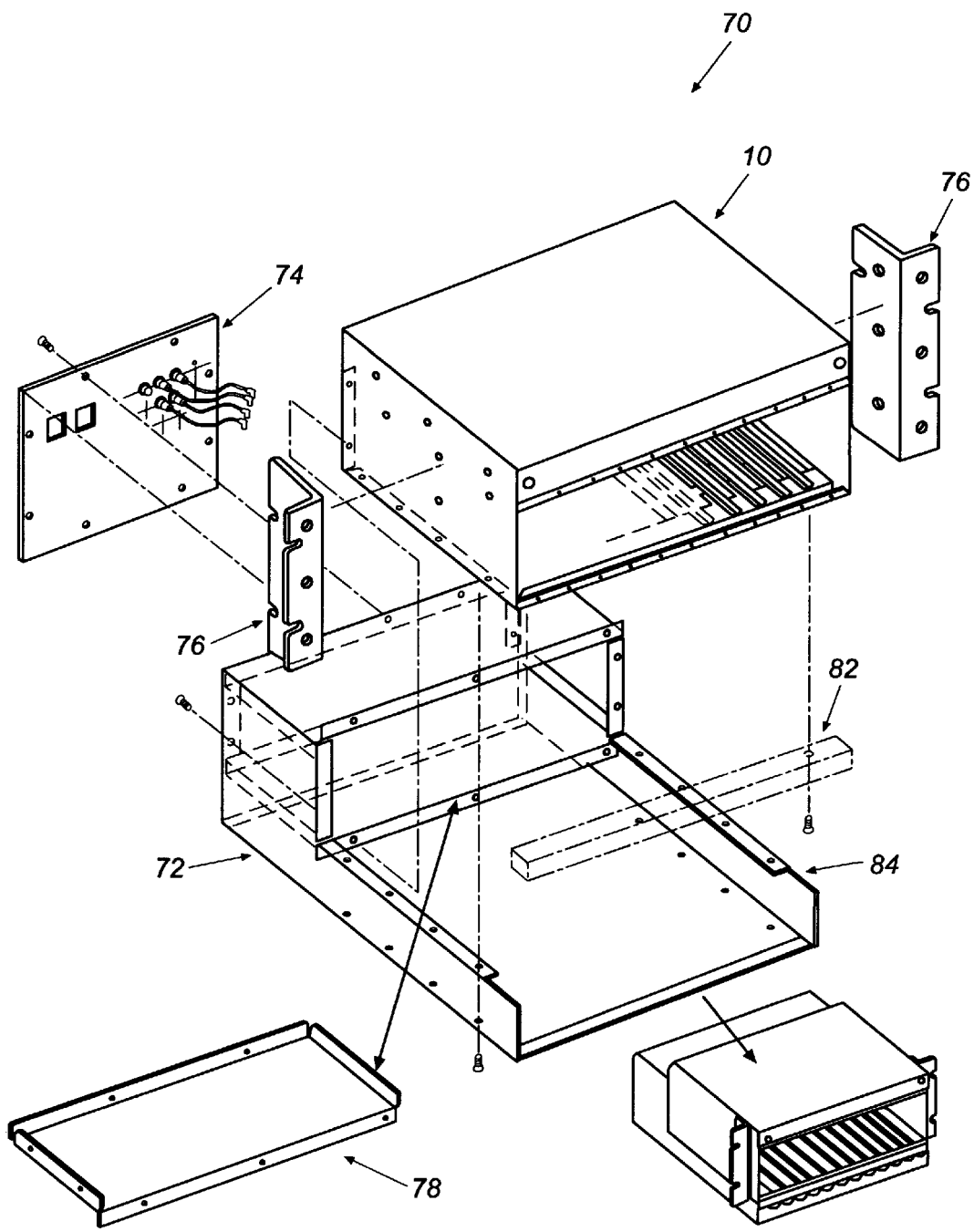
FIG. 4 shows an exploded, perspective view of the basic chassis modified to a MSO chassis that supports the cable television environment.

FIG. 4 shows an exploded perspective view of the basic chassis modified to a MSO chassis 70 that supports the MSO environment. The MSO chassis 70 encompasses the basic chassis 10 modified to comply with headend configuration, size and mounting requirements. The size of the MSO chassis 70 is approximately 17 inches wide by 14 inches deep with an overall height of about 10.50 inches and weighs about 20 pounds. The MSO chassis 70 includes the basic chassis 10, a fiber tray subassembly 72, a cable interface housing having a rear connector panel 74, mounting flange brackets 76, support brackets 78, and fiber guide brackets 82. The construction materials, assembly and finish for the MSO chassis 70 corresponds to the basic chassis 10.

MSO chassis 70 may be assembled as follows. First, the support bracket 78 attaches the basic chassis 10 to the fiber tray sub-assembly 72 creating the MSO chassis 70. Fiber guide bracket 82 is positioned between the basic chassis 10 and an upper front portion 84 of the fiber tray sub-assembly 72. The rear connector panel 74 attaches to the rear of the fiber tray sub-assembly 72 providing access to connections such as RF coax connections, power hook ups, alarms, and ICIM interfaces at the rear of the chassis 70. Mounting brackets 76 attach the MSO chassis 70 to a rack 88.

Figure 5:
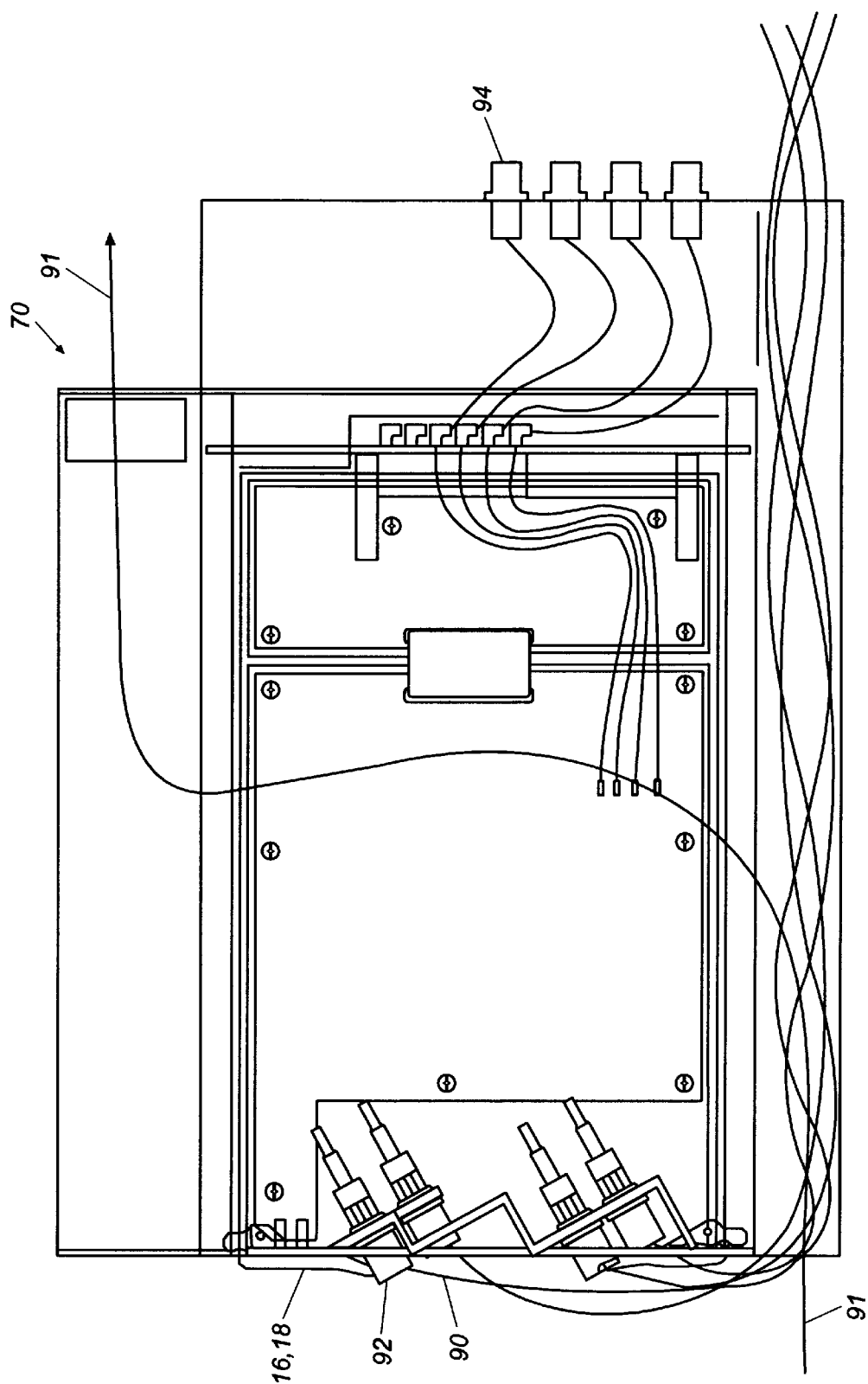
FIG. 5 shows a side view of the MSO chassis with a module inserted therein.

FIG. 5 shows a side view of the MSO chassis 70, outfitted with a transmitter 16 or receiver 18 module. The MSO chassis 70 allows fiber entry from the rear or front. The fiber 90 attaches to a connector 92 on the transmitter module 16 or receiver module 18, and then the fiber 90 routes underneath the basic chassis 10 guided by the fiber guide bracket 82 onto the fiber tray sub-assembly 72 out the rear of the MSO chassis 70. Fans 62 move the air exhaust 91 from the front of the MSO chassis 70 to the top for exhaust out the rear. Connectors 94 coupled to the housing 130 allow for rear access to RF coax connections.

Figure 6A:
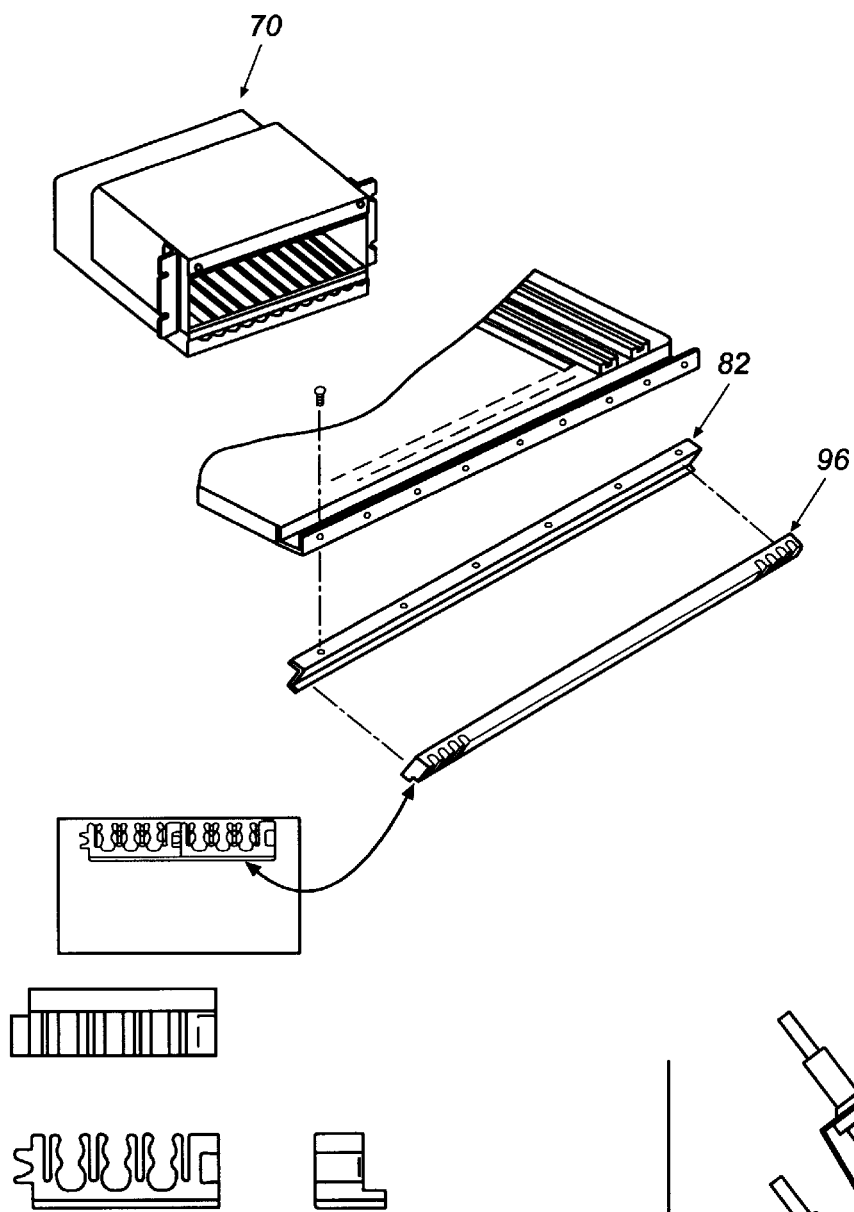
FIG. 6A shows an exploded, perspective view of the MSO chassis having a fiber guide.
Figure 6B:
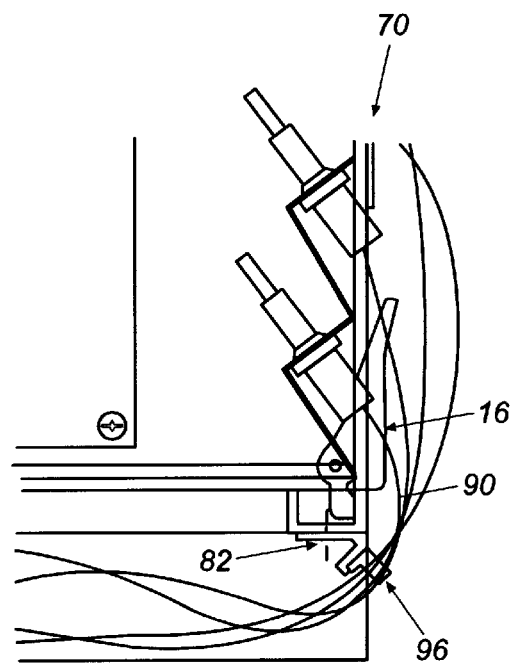
FIG. 6B shows a side view of the MSO chassis, transmitter module, fiber guide bracket and a fiber guide.

FIG. 6A shows the MSO chassis 70 with a fiber guide 96, which may be formed of plastic. As fiber 90 routes to the front it can be clipped to fiber guide 96 retainers attached to the fiber guide bracket 82. FIG. 6B shows a side view of the MSO chassis 70, transmitter module 16, fiber guide bracket 82 and the fiber guide 96. The fiber guide 96 keeps an appropriate bend in the fiber 90 limiting signal deterioration. The removable assembly of fiber guide bracket 82 and fiber guide 96 may be utilized with other configurations, for example the Telco chassis.

FIG. 7 shows a perspective, front view of the MSO chassis 70 without a fan tray 48 and modular power supplies 20. This view shows attachment of an ICIM module 14, transmitter modules 16 and/or receiver module 18 to the MSO chassis 70. Fibers 90 can attach to the transmitter module at connector 92.

FIG. 8 shows a rear view of the rear connector panel 74 of the MSO chassis 70. Like the rear of the basic chassis 10, the MSO chassis 70 includes a plurality of connectors 100, such as, ICIM control 36, Ethernet connections 37, redundancy control alarms 102, power supplies 104 and auxiliary power 39. A passageway 106 allows fiber 90 entry from the rear as well as entry from the front of the MSO chassis 70. Air exhausts 91 out of the MSO chassis 70 from the vents 59 located close to the fans 62 at the top rear of the MSO chassis 70.

In the MSO chassis 70, modular power supplies connect at the rear of the chassis. The modular power supply 104 (AC-MPS) connects to an adapter that houses the AC line cord input. When a DC-MPS is used, a similar DC adapter is utilized having a terminal block for input. The overall size of the power supply for the MSO chassis 70 includes a height of about 6.5 inches, a length of about 10 inches and a two-inch width. Power (various DC voltages) distributes via backplane connector 38 (shown in FIG. 2) through IEC 917 and IEC 1076-4-101 compatible power connectors and signal connectors from input connectors 32.

A frame or rack 88 holds up to six stacked MSO chassis 70. The six-unit configuration allows the front or rear fiber 90 routing and rear RF coax connections 94. Like the basic chassis 10, an optional front door may be placed on the MSO chassis 70.

Figure 9:
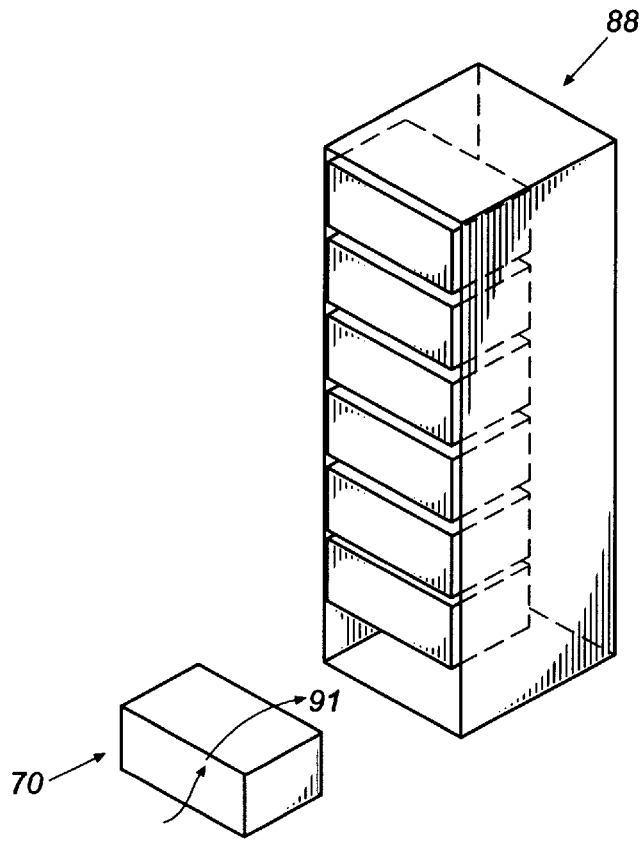
FIG. 9 shows a perspective, schematic view of MSO chassis mounted in a rack.

FIG. 9 shows a perspective, schematic view of a rack 88. The chassis design allows rack mounting in either open or enclosed 19 inch or 24-inch wide cabinets or racks per Electronic industries Association (EIA) Specification RS-310-C. The MSO chassis 70 supports a loaded weight of 150 pounds utilizing the mounting ears or mounting brackets 76 for support in either the open or enclosed rack 88 configuration. A standard six-foot (also referred to as a 40 unit standard rack) rack 88 support six MSO chassis 70. A chassis mounts to a rack 88 via removable mounting ears, or mounting brackets 76, attached to the side of the chassis. When mounted in an enclosed rack 88 having internal side attachment areas, the chassis accommodates the use of rack 88 or chassis support rails. In this configuration, air exhausts along path 91 from a lower front portion of the MSO chassis 70 and out of the rear of the chassis. In yet another embodiment, fans 62 exhausts the air out of the chassis 70 along a path directed away from other chassis 70 within the rack 88.

Using the present invention, the so-called chimney effect can be substantially eliminated. That goal is achieved by directing exhaust from each chassis along paths that do not intersect with air flow entering adjacent or other chassis within the rack 88. FIG. 9 shows one such possible exhaust path 91, although other paths are possible.

Telco Chassis

Figure 10:
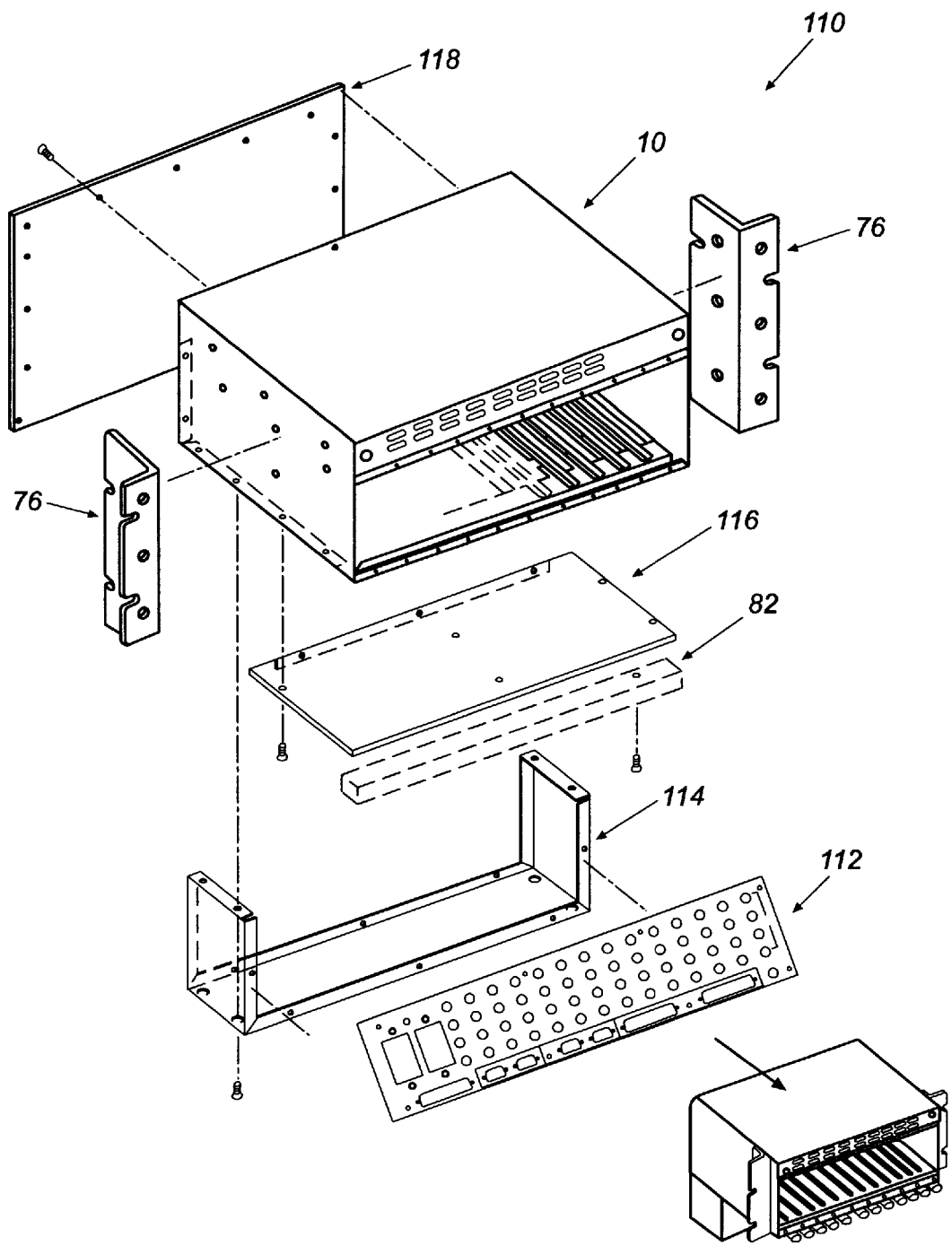
FIG. 10 shows an exploded, perspective view of the basic chassis modified to a Telco chassis that supports the telecommunications environment.

FIG. 10 shows an exploded, perspective view of the basic chassis modified to a Telco chassis 110 that supports the Telco environment. The Telco chassis 110 includes the basic chassis 10 modified to comply with U.S. and European Telco configuration, size and mounting requirements. The size of the U.S. Telco chassis 110 is approximately 17 inches wide by 12 inches maximum deep by about 14 inches tall and weighs approximately 20 pounds. The ETSI chassis requires the chassis extend no longer than eleven inches. The construction materials, assembly and finish are the same as for the basic chassis 10.

The Telco chassis 110 includes the basic chassis 10, a connector panel sub-assembly including a front connector panel 112, a housing 130 (shown also in FIG. 19) having a panel bracket 114 and a vent bracket 116, mounting flange brackets 76, and fiber guide bracket 82 and a rear cover 118. In the Telco chassis 110, all connections reside on the front of the chassis 110. The fans 62 are positioned on the front of the fan tray 48 for front air exhaust. Vents 59 located in a front portion of the fan tray 48 provide for air exhaust 91. The Telco environment requires front air exhaust 91 since the Telco chassis 110 typically mount in a frame or rack 88 in a back-to-back configuration. In another embodiment, the Telco chassis 110 exhausts air from the rear when vertically stacked in a rack 88. In yet another embodiment, fans 62 exhausts the air out of the chassis 110 along a path directed away from other chassis 110 within the rack 88.

Figure 11:
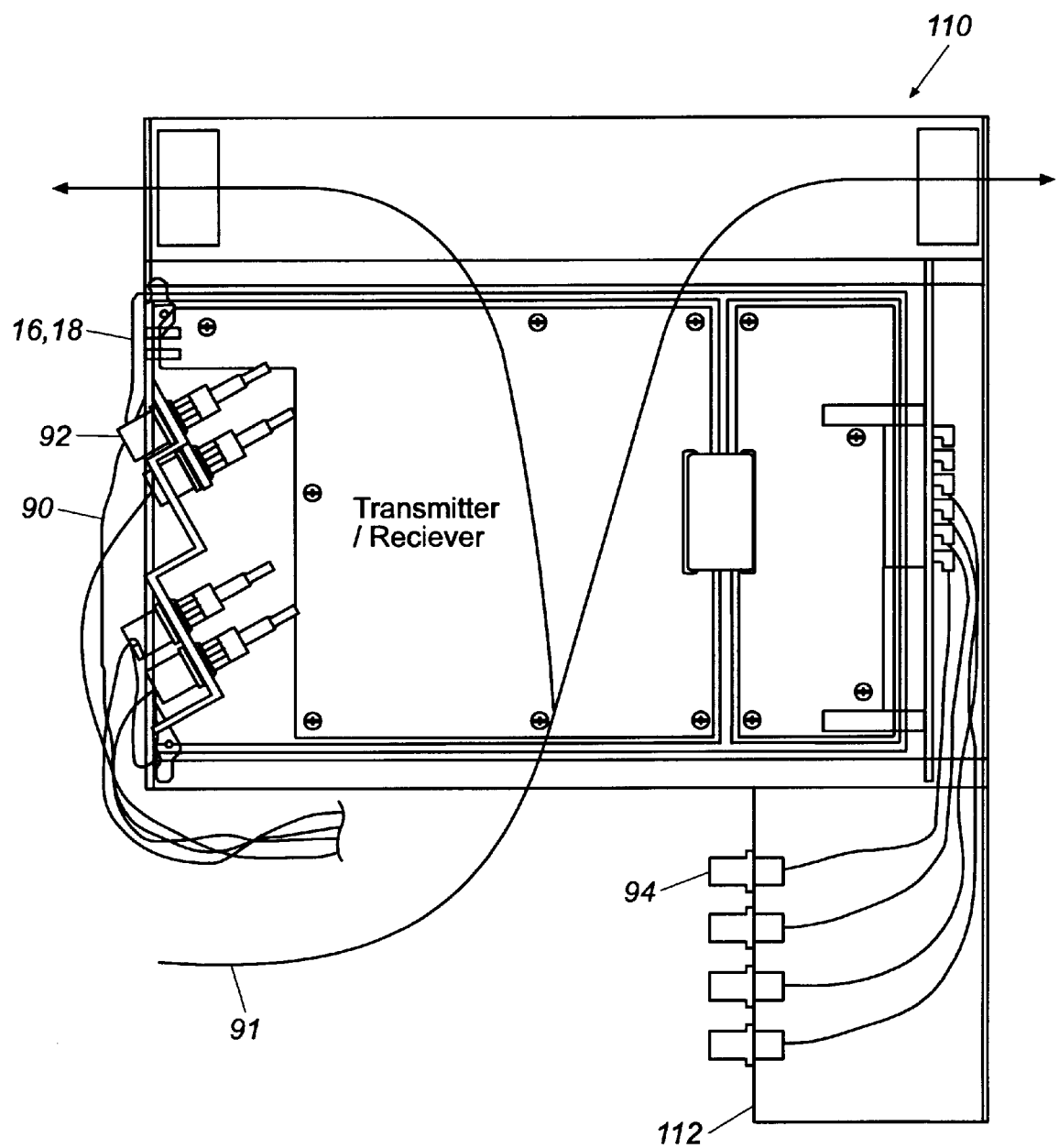
FIG. 11 shows a cut-away side view of the Telco chassis having a module inserted therein.

FIG. 11 shows a cut-away side view of the Telco chassis 110 having a transmitter (or receiver) module inserted therein. A plurality of modules such as transmitter 16 and receiver 18 modules, ICIM modules 14, and power supplies 20 insert into the basic chassis 10 portion of the Telco chassis 110. Fiber 90 routes from the module connectors 92 through the fiber guide bracket 82 or 120. The Telco chassis 110 provides for RF coax connections 94 from the front connector panel 112 of the housing 130. Exhaust air 91 entering from the front of the Telco chassis 91 can be exhausted out the front or rear of the chassis 91. A top rear air exhaust is utilized when Telco chassis 110 are mounted in a back to back configuration in a rack 88.

Figure 12:
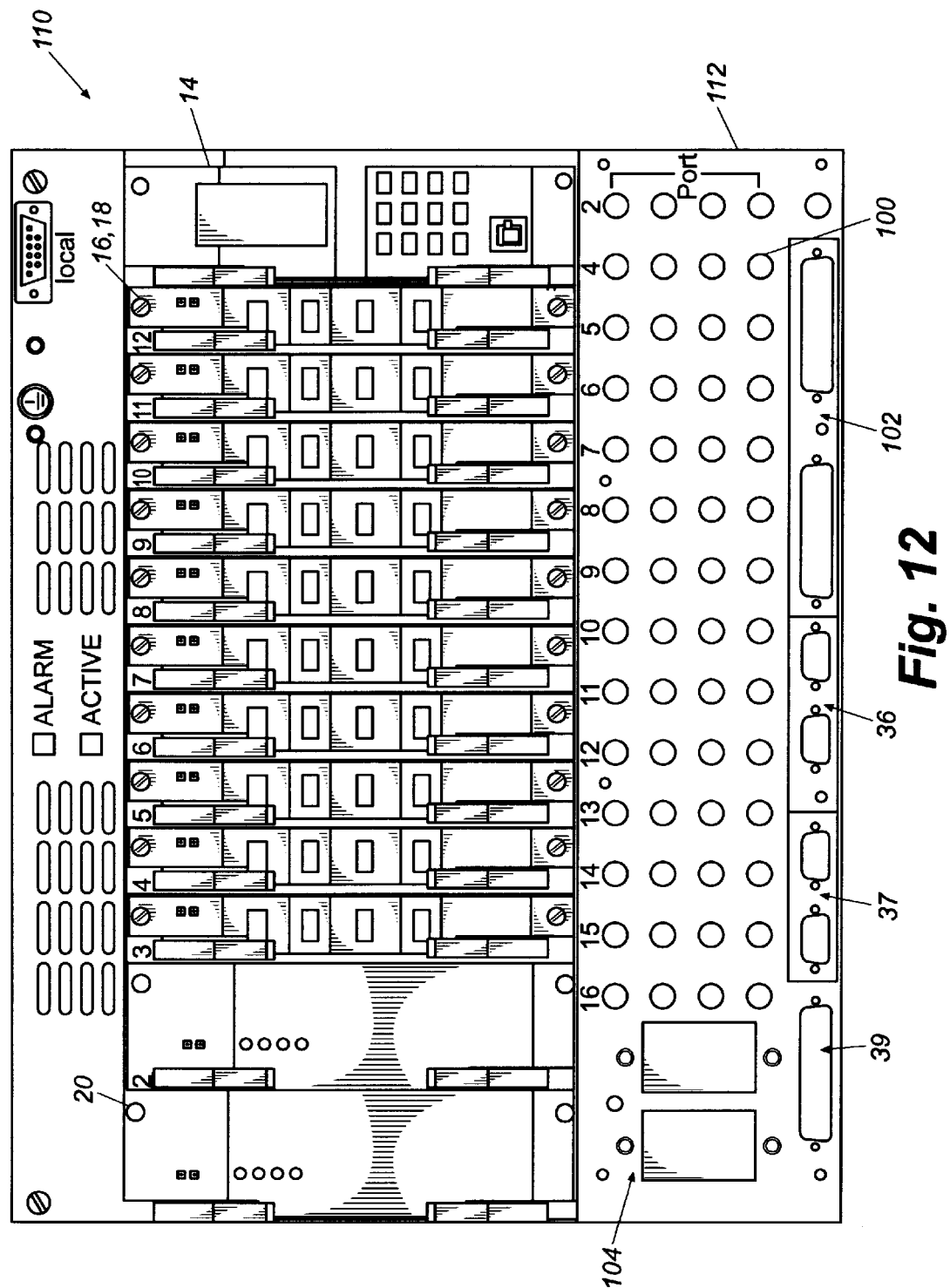
FIG. 12 shows a front view of the Telco chassis.

FIG. 12 shows a front view of the Telco chassis 110. This view shows an ICIM module 14, transmitter modules 16 and/or receiver module 18, power supplies 20 and connectors 92 attached to the Telco chassis 110. The front of the Telco chassis 110 provides for a plurality of connectors 100, ICIM control 36, Ethernet connections 37, redundancy control alarms 102, power supplies 104 and auxiliary power 39. Like the basic chassis 10, an optional front door may be placed on the Telco chassis 110.

Figure 13:
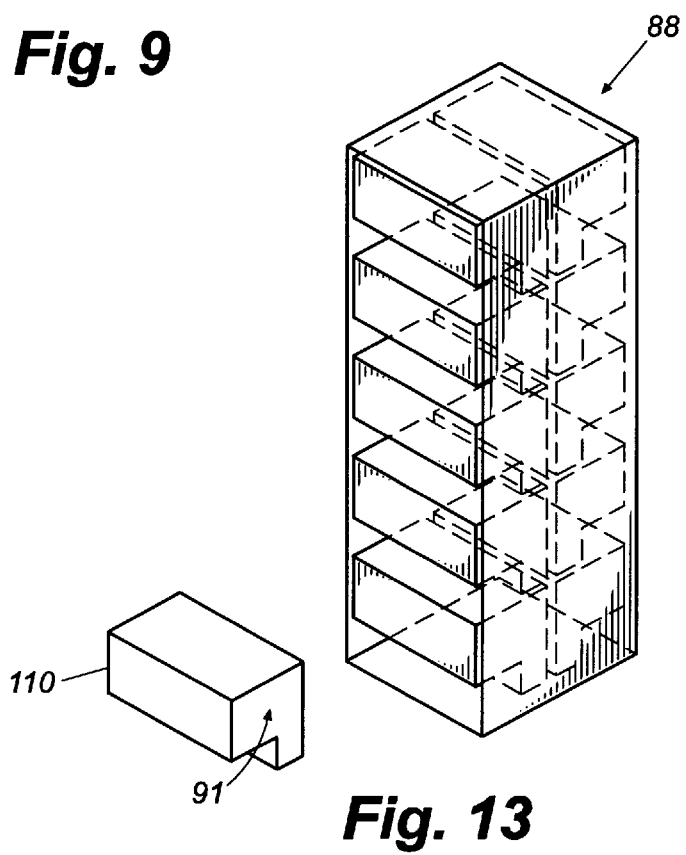
FIG. 13 shows a perspective view of multiple Telco chassis mounted in a rack.

FIG. 13 shows a perspective view of a rack 88. The Telco chassis 110 design allows rack mounting in either open or enclosed 19 or 23 inch wide cabinets or racks per NEBS BellCore GR-63-Core standard, 19 or 24 inch wide cabinets or racks per EIA Specification RS-310-C, or 535 mm wide cabinets or racks per ETS 300 119-3. A standard six-foot (also referred to as a 40 unit standard rack) rack 88 can support ten Telco chassis 110 arranged in a back-to-back configuration shown in FIG. 13. The Telco chassis 110 fits within a standard frame when stacked five units tall. Stacking of the Telco chassis 110 five units high allows for front fiber and front RF coax connections. Cable routing and power connections are also from the front side of the Telco chassis 110. Air intake for the chassis is from the front bottom and exhaust is at the top rear in a stacked configuration; and if the chassis are arranged in the back-to-back configuration, from the front via the exhaust fan tray 48. Again, like in FIG. 9, the exhaust path from chassis 110 has been arranged so as not to intersect with air flowing into other chassis 110 in rack 88. This effectively limits or eliminates the chimney effect. The Telco chassis 110 supports a loaded weight of 150 pounds utilizing the mounting ears or mounting brackets 76 for support in either the open or enclosed rack configuration.

Figure 14A:
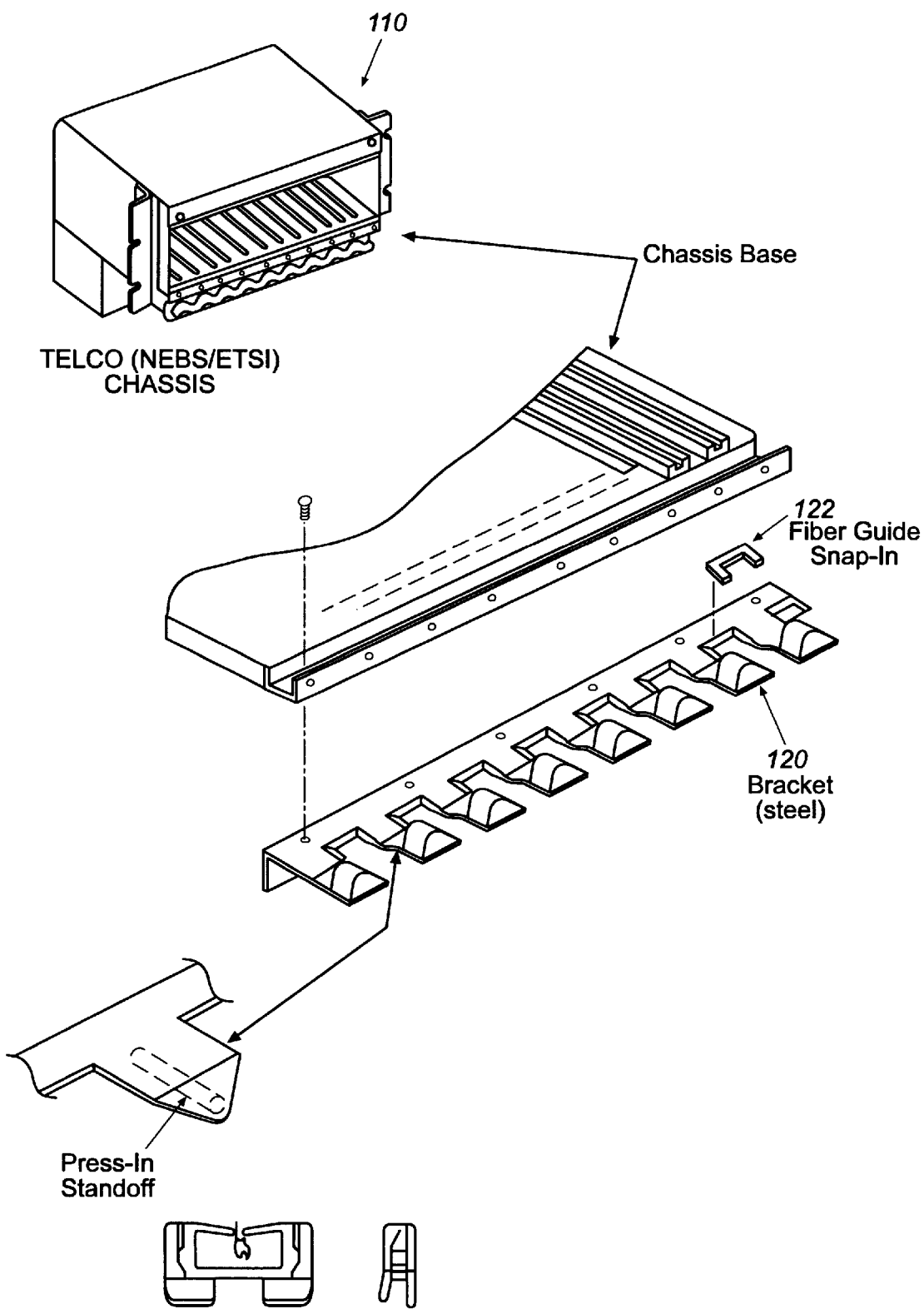
FIG. 14A shows an exploded, perspective view of the Telco chassis having a fiber guide bracket with a snap-in plastic guide.
Figure 14B:
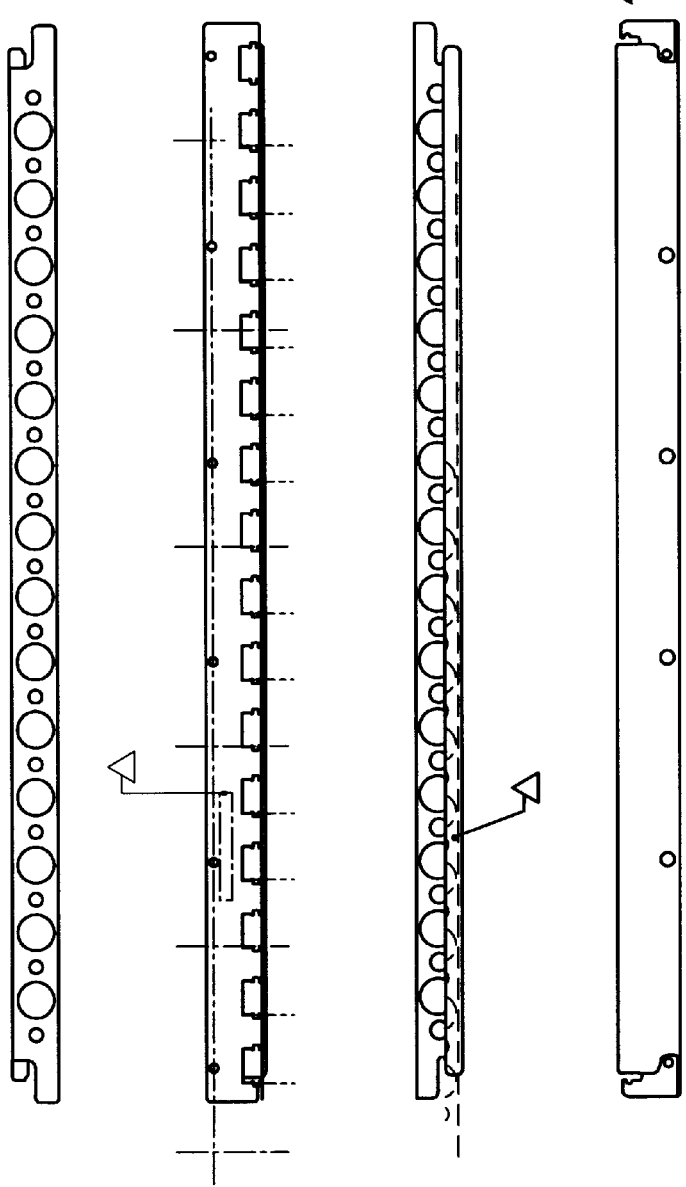
FIG. 14B shows schematic side views of alternative fiber guide brackets.

FIG. 14A shows an exploded, perspective view of the Telco chassis 110 having a fiber guide bracket 120 with a snap-in plastic guide 122. FIG. 14B shows schematic side views of alternative fiber guide brackets 120A, 120B, 120C, and 120D. Fiber 90 routes to the front of the Telco chassis 110 through the fiber guide bracket 120 allowing for cable separation and control of fiber 90 radius bends.

Figure 15:
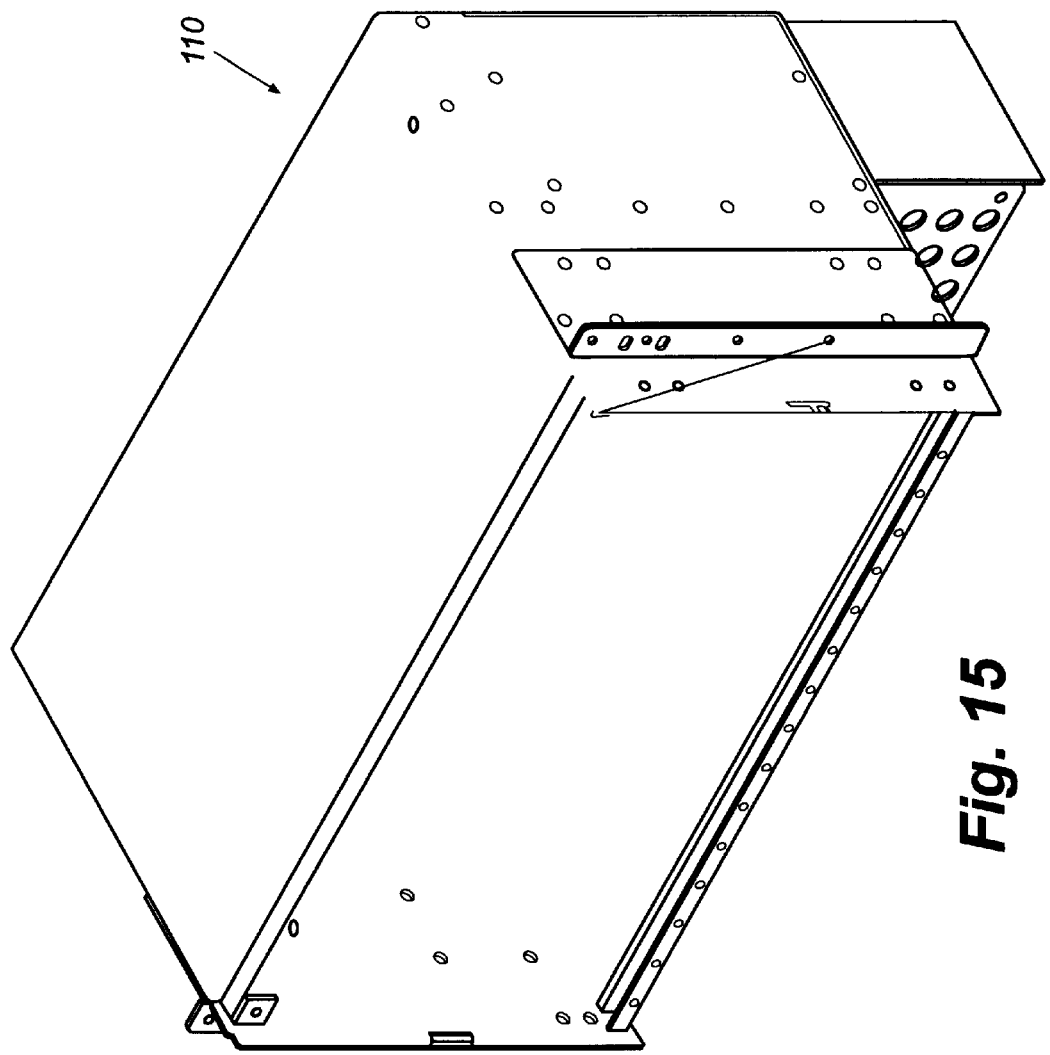
FIG. 15 shows a perspective view of a front view of the Telco chassis without modules or a fan tray.

FIG. 15 shows a perspective, front view of the Telco chassis 110 without modules or a fan tray 48. This view shows how an ICIM module 14, transmitter modules 16 and/or receiver module 18 can be attached to the Telco chassis 110.

Figure 16:
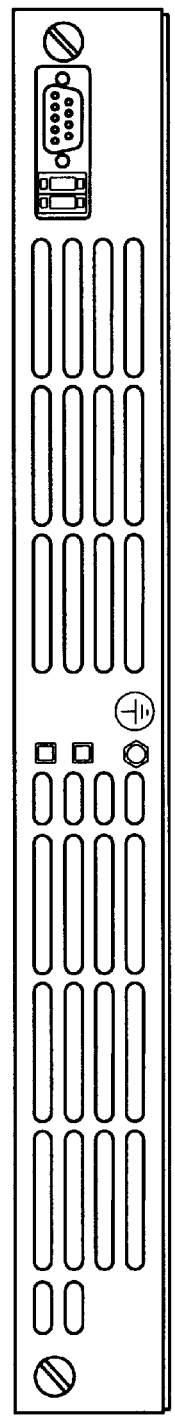
FIG. 16 shows a front view of the Telco chassis vent holes.

FIG. 16 shows a front view of the Telco chassis 110 vent holes. In one embodiment, the Telco chassis 110 positions fans 62 at the front of the fan tray 48. Air exhaust 91 in a Telco configuration expels from the rear of the Telco chassis 110 or from the front for back to back rack 88 configurations.

Modular Power Supplies

Modular power supplies 20 insert from the front of the chassis. Both the MSO chassis 70 and Telco chassis 110 can utilize AC and DC modular power supplies. As discussed above, inputs for auxiliary power reside on the chassis connector panels. Generally, an adapter, such as a MPS adapter, is positioned behind the modular power supply 20, allowing connection and flexibility to supply a customer with an AC power supply or a DC power supply. The adapter is used with appropriate supply to allow AC or DC inputs and also allows "hot swap" capabilities. After positioning the adapter into place in the chassis, either the modular power supply 20 is directly connected to the chassis (MSO chassis 70) or a cable assembly connects to the power supply and then to the adapter (Telco chassis 110).

Figure 17:
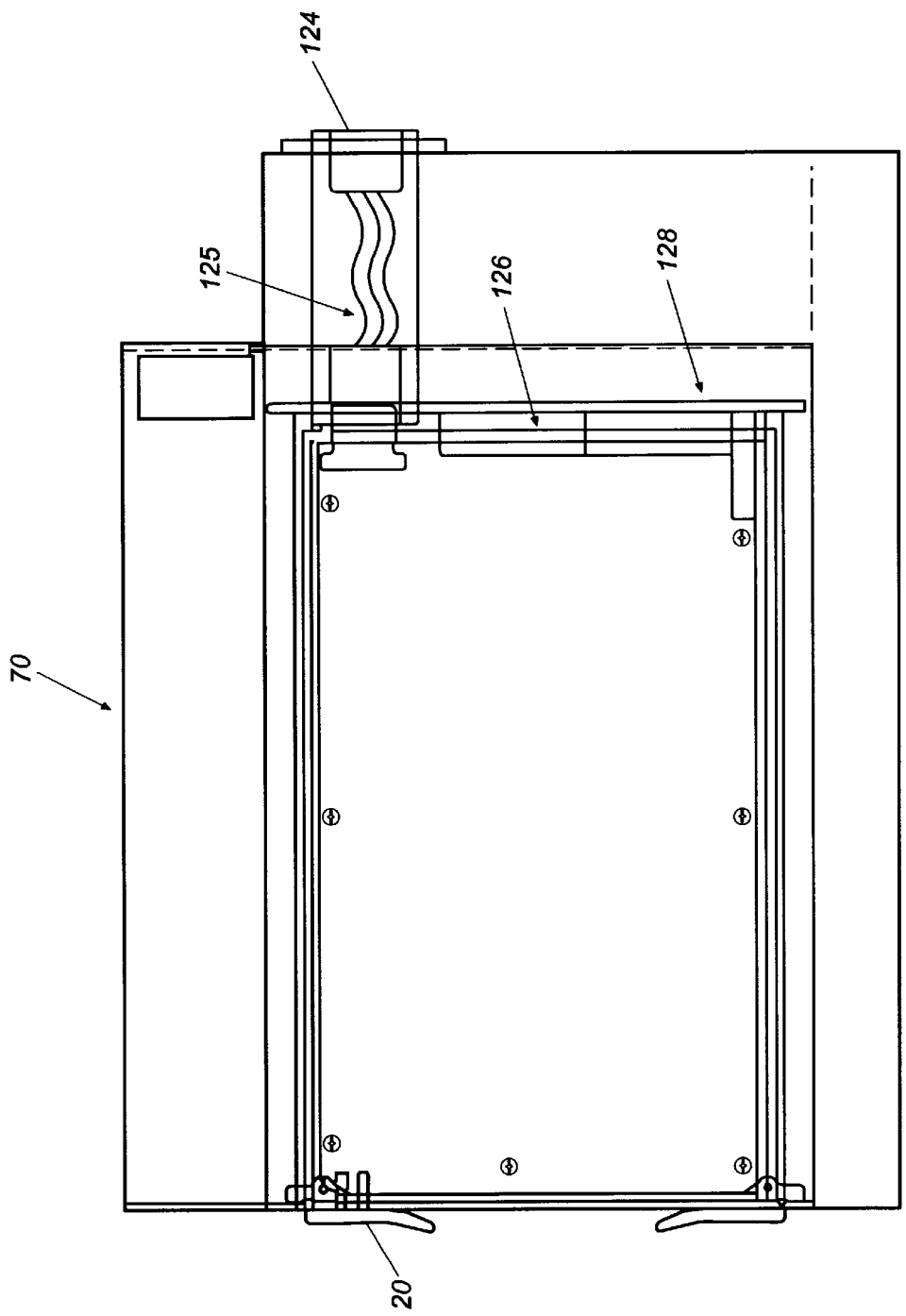
FIG. 17 shows a side view of a MSO chassis with a modular power supply.

FIG. 17 shows a side view of a MSO chassis 70 with a modular power supply 20. In the MSO chassis 70, power connections 124 extend from the rear of the MSO chassis 70. When utilizing an AC-MPS, the modular power supply 20 connects to an adapter 125 that houses the AC line cord input. When a DC-MPS is used, a similar DC adapter is utilized that has a terminal block for input. Various DC (voltages) distributes via rear panel connector 74 through AMP Z-PACK power connectors 126 and signal connectors 128. The power supply for the MSO chassis 70 is about 6.4 inches high, and 10 inches long and 2 inches deep.

Figure 18:
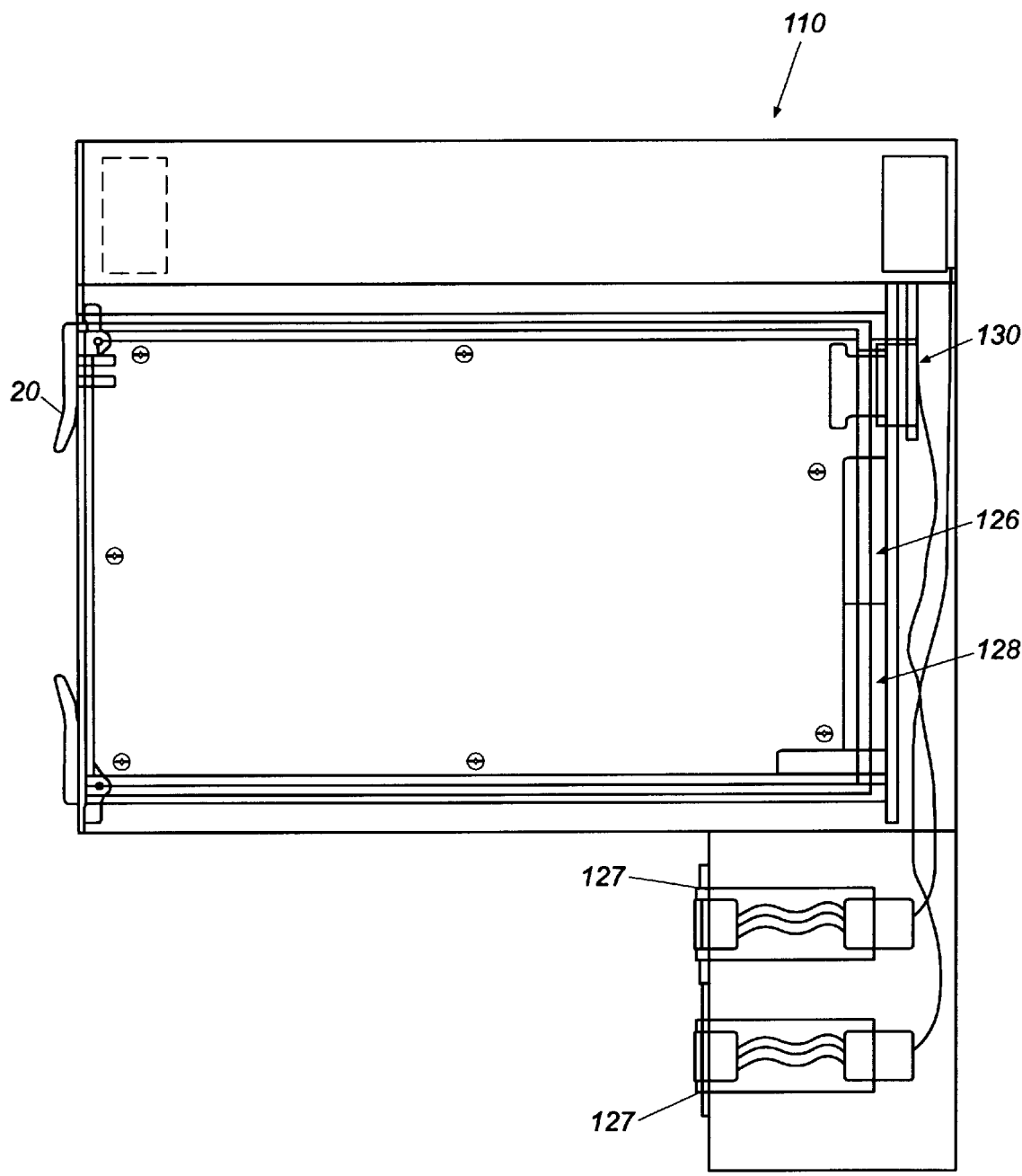
FIG. 18 shows a side view of a Telco chassis with a modular power supply.

FIG. 18 shows a side view of a Telco chassis 110 with a modular power supply 20. In the Telco chassis the AC-MPS modular power supply 20 connects to an internal panel mount cable assembly 130 that plugs into the AC input adapter 125. The AC input adapter 127 mounts on the front of the Telco chassis 110 (instead of the rear as in the MSO chassis 70) When a DC-MPS modular power supply is utilized, a similar DC adapter 127 having a terminal block input mounts on the front of the Telco chassis 110.

Figure 19:
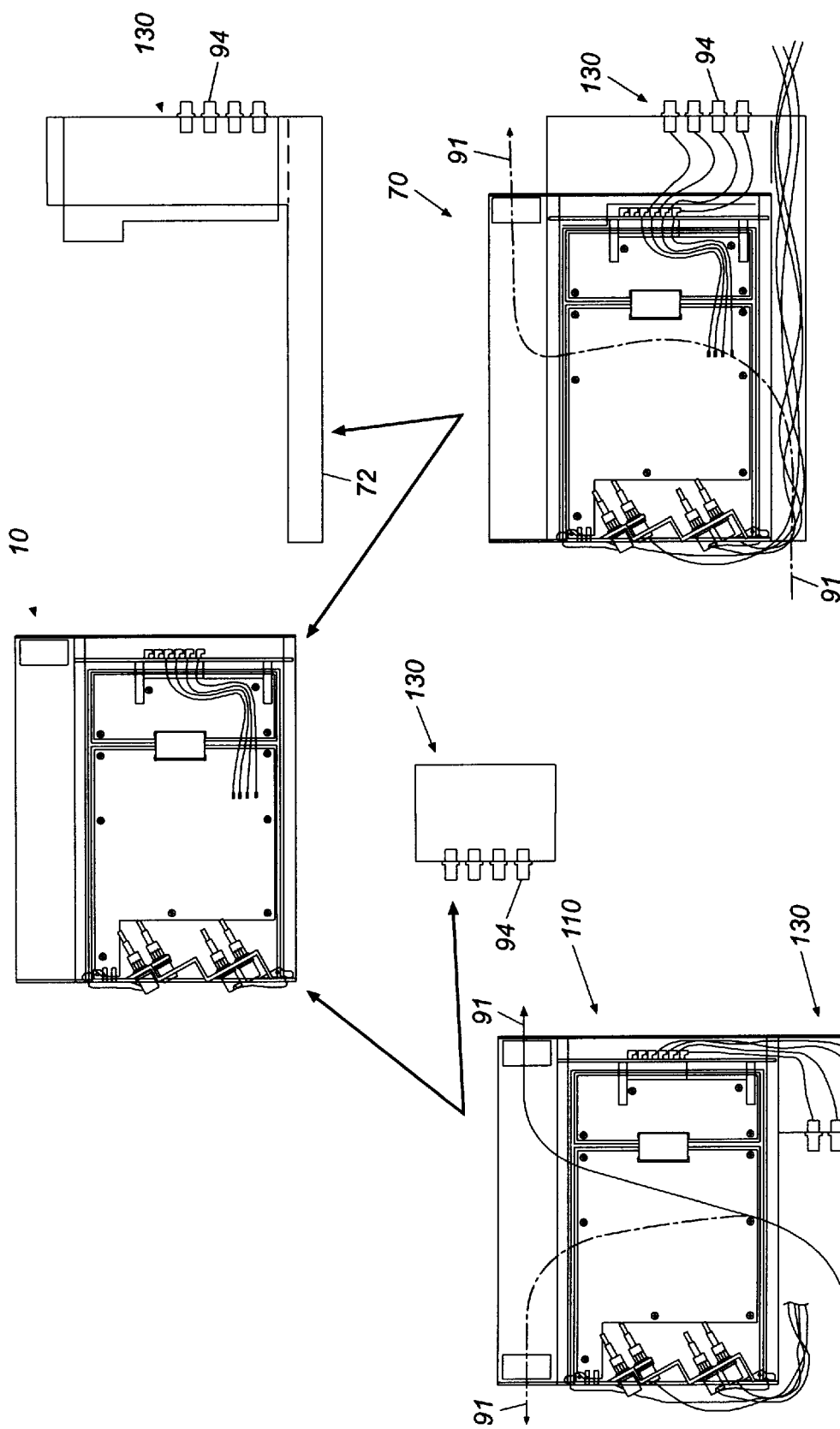
FIG. 19 shows side cut-away views of the basic chassis and the Telco and MSO chassis configured from the basic chassis.

FIG. 19 shows side cut-away views of the basic chassis 10 and the Telco and MSO chassis 70, 110 configured from the basic chassis. The basic chassis 10 of FIGS. 1–4 easily reconfigures to support the Telco and CATV markets. As shown in FIG. 19, a reconfigurable housing or cable interface assembly 130 adapts for use with the Telco chassis 110 and the MSO chassis 70. For example, the housing 130 adapts from a first position to second position on the chassis 10, reconfiguring the chassis 10 to support the Telco or CATV market. In the Telco chassis 110, the connectors 94 reside on the front of the housing 130. Alternatively, with the addition of the fiber tray sub-assembly and the housing 130 having connectors 94 of its back side, the housing 130 supports the CATV environment. The reconfigurable housing 130 adaptable for both markets reduces engineering, manufacturing and repair costs because a common housing 130 converts to support both environments.

For instance housing 130 tray be configured to couple to the chassis 10 in a first position in which it attaches to the rear of the chassis to form a Telco chassis 110. By depending from the rear, the housing 130 allows access to connectors 94 from the chassis 110 front. Alternatively, housing 130 can be reconfigured slightly in shape and dimension and placed in a second, rear position on basic chassis 10 to form MSO chassis 70. From the second position, housing 130 allows rear access to connectors 94. Skilled persons will recognize that housing 130 could be reconfigured to couple with sides, or top of the chassis.

FIG. 19 also depicts the selected path of air exhaust for the each chassis. In the Telco chassis 110, air flows 91 from the bottom of the chassis 110 through the chassis and exhausts out the front of the chassis. This selected air flow path eliminates or at least substantially limits the chimney effect when Telco chassis 110 mount in a rack 88 in a back-to-back configuration. Optionally, Telco chassis 110 utilize a rear air exhaust when vertically stacked in a rack 88. In a CATV environment where chassis stack vertically in rack 88, the MSO chassis 70 draws air 91 from the bottom of the chassis and exhausts the air 91 out the rear also eliminating the chimney effect.

An advantage of this invention is that it provides a modular chassis adaptable to the cable, U.S. Telco and European Telco markets. The modularity reduces engineering and manufacturing costs. The invention also provides for an even distribution of air transfer through the chassis eliminating the chimney effect.

In light of the foregoing disclosure of this invention and description of certain preferred embodiments, those who are skilled in this area of technology will readily understand that various modifications and adaptations can be made without departing from the true scope and spirit of this invention. All such modifications and adaptations are intended to be covered by the following claims.

What is claimed is:

1. A reconfigurable chassis for providing thermal management of external electrical modules that are inserted into the chassis and removed from the chassis, the chassis comprising:

a housing into which modules are inserted, the housing having a front portion and a back portion and further having multiple guides for holding the modules;

a removable fan tray located on top of the housing, the re movable fan tray for holding fans in first and second positions, wherein, when the fans are located in the first position, air is directed from the front portion of the chassis, and wherein, when the fans are located in the second position, air is directed from the back portion of the chassis;

a removable rear connector panel for use when electrical cables coupled to the modules are to be accessed from the back portion of the housing, wherein the removable rear connector panel is mounted to the back portion of the housing for electrically coupling to the electrical cables that are coupled to the modules;

a removable panel bracket for use when the electrical cables coupled to the modules are to be accessed from the front portion of the housing, wherein the removable panel bracket is mounted beneath the housing for routing the electrical cables from the back portion of the housing to the front portion of the housing; and a removable front connector panel for use when the electrical cables coupled to the modules are to be accessed from the front portion of the housing, wherein the removable front connector panel is mounted to the front portion of the housing for electrically coupling to the electrical cables that have been routed through the removable panel bracket.

2. The reconfigurable chassis of claim 1, wherein the electrical cables comprise coaxial cables.

3. The reconfigurable chassis of claim 1, wherein the removable fan tray includes mounting means for holding the fans.

4. The reconfigurable chassis of claim 3, wherein the removable fan tray includes vent holes formed in the front portion of the chassis.

5. The reconfigurable chassis of claim 3, wherein the removable fan tray includes vent holes formed in the back portion of the chassis.

6. The reconfigurable chassis of claim 1, wherein the removable rear connector panel comprises an interior surface, which faces towards the modules when the removable rear connector panel is coupled to the back portion of the housing, and an exterior surface, which faces away from the modules when the removable rear connector panel is coupled to the back portion of the housing.

7. The reconfigurable chassis of claim 6, wherein the removable rear connector panel further comprises electrical connectors corresponding to the electrical cables that are coupled to the modules, the electrical connectors having a first coupling mechanism, formed on the interior surface, for directly connecting to the electrical cables and having a second coupling mechanism, formed on the exterior surface, for providing electrical access to the electrical cables.

8. The reconfigurable chassis of claim 1, wherein the removable front connector panel comprises an interior surface, which faces towards the removable panel bracket when the removable panel bracket and the removable front connector panel are coupled to the housing, and an exterior surface, which faces away from the removable panel bracket when the removable panel bracket and the removable front connector panel are coupled to the housing.

9. The reconfigurable chassis of claim 8, wherein the removable front connector panel comprises electrical connectors corresponding to the electrical cables that are coupled to the modules, the electrical connectors having a first coupling mechanism, formed on the interior surface, for directly connecting to the electrical cables and having a second coupling mechanism, formed on the exterior surface, for providing electrical access to the electrical cables.

10. The reconfigurable chassis of claim 1, further comprising:
   a fiber guide bracket mounted to the housing for optically coupling to fiber cables that are coupled to the modules.

11. The reconfigurable chassis of claim 10, wherein the fiber guide bracket includes optical connectors that are optically coupled to the fiber cables and that are accessible from the front portion of the housing.

* * * * *

UNITED STATES PATENT AND TRADEMARK OFFICE
CERTIFICATE OF CORRECTION

PATENT NO. : 6,195,493 B1
DATED : February 27, 2001
INVENTOR(S) : Bridges

It is certified that error appears in the above-identified patent and that said Letters Patent is hereby corrected as shown below:

In the Abstract delete "When the electrical cables coupled to the modules are to be accessed front the front portion of the housing, a removable front connector panel is also used, and the removable front connector panel is mounted to the front portion of the housing for electrically coupling to the electrical cables that have been routed through the removable panel bracket."

And insert therefore -- When the electrical cables coupled to the modules are to be accessed from the front portion of the housing, a removable front connector panel is also used, and the removable front connector panel is mounted to the front portion of the housing for electrically coupling to the electrical cables that have been routed through the removable panel bracket. --

Signed and Sealed this

Seventh Day of August, 2001

*Attest:*

*Attesting Officer*

NICHOLAS P. GODICI
*Acting Director of the United States Patent and Trademark Office*